Patented Apr. 11, 1950

2,503,238

UNITED STATES PATENT OFFICE 2,503,238

RECOVERY OF DEHYDROABIETIC ACID

Frederick H. Gayer, Chicago, Ill., assignor to Continental Research Corporation, Chicago Heights, Ill., a corporation of Illinois No Drawing. Application July 15, 1948, Serial No. 38,941

10 Claims. (Cl. 260—100)

This invention relates to the recovery of dehydroabietic acid in the crystalline form from resin acid material in which abietic acid has been largely converted to dehydroabietic acid.

In one specific embodiment, the present invention relates to a process for separating crystalline dehydroabietic acid from disproportionated rosin of commerce.

As is known, dehydroabietic acid is obtained from abietic acid by removing two atoms of hydrogen, whereby transforming the II or C ring into an aromatic ring. The starting materials for producing dehydroabietic acid are rosin, tall oil resin acids or abietic acid. Treatment of the starting material at temperatures of the order of 250° C. is necessary to bring about dehydrogenation, the duration of the treatment ranging from a few hours to about one hundred hours, depending on whether catalysts, such as palladium carbon, are or are not present. While the main product of the reaction is dehydroabietic acid, there have been shown to be present in the reaction mixture minor quantities of dihydro- and tetrahydroabietic acids resulting from the addition to unreacted abietic acid of hydrogen which was split off in the dehydrogenation reaction. Therefore, the reaction, since it involves a redistribution of hydrogen between abietic acid molecules, is called disproportionation and the resulting product, if made from rosin, is known as disproportionated rosin. Another method for preparing dehydroabietic acid involves an altogether different mechanism and is based on the reaction of abietic acid or mixtures containing it with sulphur or related elements. If, one gram atom of sulphur is made to react with one gram molecule of abietic acid at about 180° C., two gram atoms of hydrogen will be split off from the abietic acid, giving as principal reaction products dehydroabietic acid and hydrogen sulphide.

Even if the starting material for preparing dehydroabietic acid was relatively pure abietic acid, the resulting dehydroabietic acid will always be diluted by other substances such as the hydrogenated abietic acids and/or products of side reactions, especially decarboxylation. The proportion in the reaction product of dehydroabietic acid to impurities is even less favorable if the starting material was rosin which contained neutral bodies and resin acids, like d-pimaric, which are not isomerized to abietic acid and therefore cannot furnish dehydroabietic acid.

The industrial usefulness of disproportionated rosin, of which dehydroabietic acid is the main component, is due to the inertness of dehydroabietic acid to mild chemical influences, such as, for example, oxidation. On the other hand, dehydroabietic acid is capable of undergoing all of the basic substitution reactions characteristic of aromatic compounds, such as sulphonation, nitration, halogenation, etc. Therefore, dehydroabietic acid is a potential starting material for a large number of possible derivatives. For the synthesis of such derivatives it is obviously of advantage to use substantially pure dehydroabietic acid as starting material instead of the complex mixture of resin acids and neutral bodies obtained in the dehydrogenation reaction. While workers in this field have separated dehydroabietic acid from the accompanying impurities, their methods were based on crystallization in organic solvents which makes such separation commercially unattractive.

According to the present invention, and in distinction from the prior art, dehydroabietic acid is obtained in a substantially pure form by using water as the crystallizing medium. A necessary condition for the formation of a crystal line product is a minute subdivision and uniform distribution, briefly, a dispersion of a resin acid mixture containing dehydroabietic acid as its main component, in water as the dispersion medium. I have found that in aqueous dispersions of such resin acid mixtures in which the resin acids may or may not be partially neutralized with an alkali metal base, on standing, especially at somewhat elevated temperatures, dehydroabietic acid will crystallize and that under favorable conditions it is possible to precipitate substantially all of the dehydroabietic acid in the crystalline form, while the accompanying resin acids and neutral bodies remain in the dispersion. By separating the crsytals from the aqueous phase, as by filtration, dehydroabietic acid of high purity is obtained, the filtrate containing the other resin acids and the neutral bodies originally present in the starting material.

The following example contains the important features of the present invention.

Example 1

Ten grams disproportionated rosin, acid number 154, were neutralized by refluxing with 6.6 cc. 4.18 N sodium hydroxide and the resulting soap solution diluted with 300 cc. water. The temperature of the soap solution was now raised to 95° C. and 10.3 cc. 2 N sulphuric acid was added with agitation to decompose 75% of the resin acid soap. The resulting dispersion was allowed to stand at 80° C. for three hours during which time dehydroabietic acid crystals were formed in the dispersion. The crystals were separated by filtration.

Crystalline product: 3.5 grams dehydroabietic acid; acid number 179; specific rotation +39°.

This example strikingly illustrates the simplicity and economy of the present process in obtaining dehydroabietic acid of high purity, as compared to the methods of the previous art which were based on the use of organic solvents. It is easily seen, however, that, as to results, crystallization from aqueous dispersion is fully equivalent to crystallization from organic solvents, i. e. the dehydroabietic acid crystallizes from a medium which itself retains the non-crystallizing acids and the neutral bodies. Indeed, crystallization from dispersion according to the present invention may be looked upon as a partial, irreversible and oriented flocculation which affects only the dehydroabietic acid portion of the dispersed phase. In other words, the dispersions underlying the present process are highly unstable as regards the dehydroabietic acid portion but stable as to the accompanying resin acid portion of the dispersed phase. This difference in stability makes a clean separation of the two types of resin acids possible.

Briefly, the present invention consists of making a dispersion of the starting material to be processed in a suitable quantity of water and allowing the dispersion to stand until the dehydroabietic acid has precipitated in the crystalline form. The resin acid mixture forming the dispersed phase may be partially neutralized and I have found that the extent of such neutralization is of critical importance. Therefore, an important characteristic of the dispersions is the proportion of free resin acids in the dispersed phase to the total quantity of resin acids present in the dispersion. This proportion will be termed free resin acid ratio, abbreviated FRA, and is defined as the percentage of free resin acids related to the total of free and neutralized resin acids present in the dispersion. Dispersions in accordance with the present invention are of a free resin acid ratio of from about 40% to 100%. The lower limit depends to a great extent on the starting material but, as a general experience, I have found that no crystallization of dehydroabietic acid of any practical magnitude takes place if more than 50% to 60% of the resin acids present in the dispersion are neutralized. The preferred free resin acid ratios range from 60% to 100% because within these limits the yield of crystalline dehydroabietic acid is the highest.

I will now describe in detail the starting materials used and individual process steps, such as methods for obtaining the required FRA ratio and for creating dispersions, the effect of the concentration of the dispersed phase, of salt concentration, of temperature, and other factors entering into the present process.

Starting materials for the present process are resin acid materials containing dehydroabietic acid in practical quantities, regardless of the source from which such resin acid mixtures were obtained and regardless whether the dehydroabietic acid was produced strictly by disproportionation or by partial dehydogenation and wherein the abietic acid content has been converted, so that the principal component of the resulting mixture is dehydroabietic acid. Thus, rosin, isomerized rosin, tall oil resin acids and abietic acids are the raw materials for producing resin acid mixtures of appreciable dehydroabietic acid content. The most attractive starting material is commerical disproportionated rosin which is obtained by heating rosin in the presence of a supported palladium catalyst (Patent 2,154,629). Resin acid mixtures in which disproportionation is brought about by other means, such as, for example, heating with iodine (Patent 2,311,386), or which are the result of a partial dehydrogenation reaction, as, for example, by heating with sulphur (Lombard: Bull. Soc. Chim. 9, 833–5 (1942)), are equally suitable starting materials. The materials subjected to disproportionation or partial dehydrogenation may contain other types of organic acids, as, for example, is the case with a tall oil resin acid fraction which may be treated with a disproportionating catalyst either before or after its separation from the fatty acid fraction. A disproportionated or partially dehydrogenated tall oil resin acid fraction still may contain a minor portion of fatty acids and yet be successfully treated according to the present invention, without first removing the fatty acids.

The simplest method for preparing resin acid dispersions consists of transforming the starting material into an alkali metal soap, diluting the soap with a suitable quantity of water and then establishing the desired free resin acid ratio by decomposing the soap to the desired degree with an acid, such as sulphuric acid. If such decomposition is accompanied by moderate agitation, the liberated resin acids will form a dispersion suitable for the present process. Or the starting material may be only partially neutralized, for example, 50% or more, with a strong alkali and then dispersed in the requisite quantity of water either by agitation or by suitable dispersing machines (colloid mills, homogenizers). If a higher free resin acid ratio is desired than was used in making the dispersion, such dispersions can be treated with acid to decompose the corresponding quantity of soap. Thus, using disproportionated rosin as starting material, I may, as a first step, neutralize 65% of the acidity of the rosin, disperse this mixture in water and then increase the free resin acid ratio from 35% to 80% by decomposing soap equivalent to 45% of the total resin acids present in the dispersion.

Besides employing agitation or employing dispersing machinery, other methods for obtaining dispersions can be used. For example, the starting material as such or in the partially neutralized state may be dissolved in a small quantity of a water miscible solvent, such as alcohol, and the solution stirred into a suitable quantity of water. Another method for obtaining dispersions yielding crystalline dehydroabietic acid consists of replacing the alkali metal base with ammonia or a volatile organic base and driving off from the resulting ammonium or amine soap solution most or all of the volatile base which leaves the resin acids in a finely dispersed state. All these methods can be varied according to one or the other of the several modifications known to dispersion technology. For example, I may disperse a mixture of free resin acids and resin acid soaps in water, or disperse resin acids in a resin acid soap solution, or disperse resin acids in a suitable quantity of water containing sufficient alkali to produce the required quantity of soap.

A combination of dispersing methods also may be employed. For example, I may create a dispersion of a partially neutralized starting material by simple agitation and then run the dispersion through a dispersing or homogenizing machine to obtain a finer dispersion. Or I may partially neutralize the resin acids with a portion of alkali corresponding to the final free resin acid ratio and solubilize all or part of the balance of the resin acids with ammonia, then drive off the ammonia and thereby disperse the resin acids liberated by the removal of ammonia. A dispersion also may be diluted with water to decrease the proportion of its solids content, or two dispersions of a different FRA ratio may be combined in such proportions that the resulting dispersion will be of the desired FRA ratio. From the foregoing, it must be evident that a large number of variations is possible for producing a certain FRA ratio or for creating suitable dispersions and, therefore, the present invention is not limited to or dependent upon any particular method or sequence of steps in establishing a FRA ratio or creating a dispersion. In general, I prefer creating a crystallizing dispersion simultaneously with adjusting the FRA ratio by decomposing a neutral, or nearly neutral, or at least completely water-soluble resin acid soap with acid because with this method satisfactory dispersions can be made with a minimum of mechanical work and simple equipment.

It also will be recognized by those skilled in the art that while the results obtainable according to the present invention so far have been considered to be a function of the FRA ratio, they also may be expressed in terms of hydrogen ion concentration of the dispersion. Thus, I found that the pH accompanying FRA ratios from about 40% to 100% ranges from approximately 8.5-9.0 to about 3-4 and, at a constant FRA ratio, depends on the type of resin acids present, on the concentration of the dispersed phase and soap, the alkali metal base and decomposing acid used, salt concentration, temperature, etc. Under otherwise standard conditions, especially in large scale operation, the pH as a control factor can conveniently replace or supplement the use of the FRA ratio as a measure of the proportion of free resin acids to resin acid soaps.

The proportion of water to the resin acid starting material is of considerable importance in preparing the dispersions. This proportion, to be termed "water ratio," is defined as "parts by weight of water to one part of starting material," the latter including not only free and neutralized resin acids but also neutral bodies and impurities.

The dispersions underlying the present process are of the oil-in-water type. As is known, to obtain such dispersions of resin acids, the water has to be present in considerable excess over the total resinous matter. For example, if, to facilitate dispersion, at first more than 25% of the acidity of the starting material is neutralized by heating under reflux with a strong, about 2 N alkali, a water-in-oil type dispersion results. A sudden reversion of phases will take place if now about 5 parts of hot water are added rapidly. In general, the formation of oil-in-water type dispersions of resin acids requires a minimum water ratio of from about 5 to 10, depending on the FRA ratio. On the other hand, a minimum water ratio of approximately 10 to 20 is necessary for good dispersion. The preparation of dispersions, especially at free resin acid ratios near 100%, becomes easier as the water ratio is increased. Water ratios as high as 200 or more can be used. However, at these excessive water ratios the yield of dehydroabietic acid is considerably lower than at lower water ratios. My preferred limits are a water ratio of at least 20 and not more than 100.

Another factor influencing the preparation of dispersions is the presence of salt dissolved in the dispersing medium. Such salt may originate from the decomposition reaction between resin acid soap and mineral acid in adjusting the free resin acid ratio and preparing the dispersion, or may be introduced by the water used, or may be contained in the starting material. There is a certain maximum salt concentration below which dispersions are easily made and crystallization proceeds smoothly resulting in well-developed crystals. When the salt concentration exceeds the maximum limit, dispersion becomes difficult and a portion of the material to be dispersed may be precipitated in the resinous form. Maximum salt concentration for sodium sulphate, for example, are of the order of 1.0% to 2.0% with respect to the water present. By using a sufficiently high water ratio in preparing or diluting the dispersions, the salt concentration can be conveniently reduced below the maximum concentration. If the salt is sodium sulphate or sodium chloride, I prefer to work at concentrations of about 1% or less. In the foregoing Example 1, the composition of the sodium soap with 10.3 cc. to 2 N sulfuric acid caused the formation of 1.46 grams sodium sulfate which, dissolved in 300 cc. water, gives a salt concentration of 0.49%.

Of considerable importance for a successful operation of the present process is the temperature at which dispersions are prepared and at which crystallization is allowed to proceed. I have found that both process steps can be carried out at a temperature range of from approximately normal room temperature to the boiling point of water. However, I prefer to work within a temperature range of from approximately 35° C. to 100° C. because in this range dispersions are easier made and crystallization takes place more rapidly than near room temperature. Even in the preferred temperature range dispersions frequently require stimulation by seeding or agitation to bring about crystallization.

Variations as to temperature are possible inasmuch as preparing the dispersions and crystallizing them can be done at different temperatures.

The alkaline agents most likely to be used in commercial operation for neutralizing resin acids are sodium carbonate or sodium hydroxide. Other alkaline sodium compounds can be used. Potassium is fully equivalent to sodium. The use of ammonia for first solubilizing and then dispersing resin acids is especially economical since the ammonia driven off the ammonium soap solution can be recovered and reused again in processing a subsequent batch of the starting material. Also, the decomposition of the ammonium soap, either partial or complete, can be effected by heating. Thus, no salt is introduced into the dispersing medium, and after removing the non-crystallizing portion from the filtrate by boiling or with the aid of a water-immiscible solvent, the water can be used again. Mixtures of several alkaline neutralizing substances can be used. For the decomposition of resin acid soaps a number of acids, organic or inorganic, or acid salts like sodium bisulphate, can be used. For plant scale work, I prefer sulphuric acid suitably diluted. It is immaterial whether the acid is added to a suitably diluted soap solution or whether the soap solution is poured into water containing the requisite amount of acid.

Dispersing agents or protective colloids, such as fatty acid soaps, sulphonic acids, sulphonates, casein, etc. can be used in preparing dispersions, especially at FRA ratios near 100%. The principal advantage of their use consists in keeping dispersed colored resinous impurities which occasionally coagulate before or during crystallization. However, the presence of added dispersing agents is, regardless what the FRA ratio, not at all necessary to obtain crystallizing dispersions according to the general principle of the present invention.

The time required for complete crystallization of the dehydroabietic acid ranges from one to several hours. The rate of crystallization and correspondingly the size of crystals are conveniently controlled by the water ratio, higher ratios, i. e. lower concentrations of the dispersed phase, favoring slow crystallization and the formation of large crystals.

The crystalline dehydroabietic acid obtained according to the present invention is of a high degree of purity as compared with the starting material, although it will be understood that the crystalline material may contain a minor proportion of accompanying resin acids, such as, for example, di- and tetra-hydroabietic acids. As shown by the examples, the acid number of the dehydroabietic acid fraction obtained from disproportionated rosin is considerably in excess of the acid number of the starting material which is 154, and approach the calculated value which is 187. A similar increase is shown in the melting points (R. & B.) of the fused dehydroabietic acid and the specific rotation. The color of the fused dehydroabietic acid also shows a great improvement over that of dark-colored starting materials. To reduce its bulkiness, the crystalline dehydroabietic acid may be melted and rapidly cooled to form a compact glassy resin of the appearance of rosin. If kept at temperatures between its melting point (R. & B.) and approximately 140° C., the fused abietic acid will rapidly crystallize.

The material remaining in dispersion after the dehydroabietic acid has crystallized can be recovered and utilized in a number of ways. The solids content of the filtrates can be recovered by breaking the dispersion as, for example, by the addition of acid or salt. The resulting mixture of resin acids and neutral bodies can be subjected to refining processes or chemical treatment. Or the melting point and acid number of the resin acids can be considerably increased by removing the neutral bodies. Such removal of the neutral matter can be effected by neutralizing the resin acid content with an alkali metal base, such as sodium hydroxide, regulating the concentration of the soap solution to provide more than 30 grams of neutralized resin acids per 100 grams of soap solution, and extracting the neutral bodies with a solvent such as a hydrocarbon solvent. In contrast to the dehydroabietic acid portion, the resin acids remaining in dispersion are non-crystallizing when kept for prolonged periods at temperatures ranging from their melting point to about 150° C.

The following examples show some of the applications of the present process and some of the numerous variations in procedure for obtaining dispersions of a certain FRA ratio:

Example 2

In 10 grams disproportionated rosin 10% of the acidity was neutralized with sodium hydroxide and the resulting mixture solubilized with excess ammonium hydroxide contained in 1 liter water. The soap solution was now heated until the ammonium soaps were decomposed and the odor of ammonia disappeared. The pH of the solution was now 7.0. The dispersion was allowed to stand at 70–80° C. for several hours.

Crystalline product: 3.3 grams dehydroabietic acid, acid number 180.

Example 3

Ten grams disproportionated rosin were solubilized with excess ammonium hydroxide contained in 1 liter water. The ammonium soap was now decomposed, etc., as in Example 2.

Crystalline product: 4.0 grams dehydroabietic acid, acid number 183.

Example 4

A mixture of 10 grams disproportionated rosin and 1 gram soy bean oil fatty acids was completely neutralized and the soap solution diluted with boiling water to 1 liter. Dilute sulphuric acid was now stirred into the solution in a quantity equivalent to the resin acid soaps present. The resulting dispersion was allowed to stand at 70–80° C. until the dehydroabietic acid crystallized.

Crystalline product: 3.8 grams dehydroabietic acid, acid number 178.

Example 5

The following table contains the yields of dehydroabietic acid crystallized from dispersions of disproportionated rosin at different FRA ratios, water ratios, salt concentrations and pH values.

| No. | FRA, per cent | Water Ratio | Na$_2$SO$_4$ Conc., per cent | pH of Dispersion | Yield, per cent | Acid No. |
|---|---|---|---|---|---|---|
| 1 | 25 | 25 | 0.12 | | (1) | |
| 2 | 25 | 100 | 0.0 | 9.0 | (2) | |
| 3 | 40 | 75 | 0.0 | | | |
| 4 | 50 | 50 | 0.16 | 8.9 | 21 | 168 |
| 5 | 60 | 50 | 0.21 | 8.7 | 23 | 175 |
| 6 | 70 | 25 | 0.45 | 8.1 | 26 | 174 |
| 7 | 70 | 50 | 0.25 | | 33 | 174 |
| 8 | 80 | 40 | 0.23 | 7.4 | 50 | 178 |
| 9 | 80 | 50 | 0.17 | | 43 | 180 |
| 10 | 90 | 100 | 0.0 | 6.1 | 33 | 180 |
| 11 | 100 | 100 | 0.0 | 4.0 | 40 | 183 |

[1] No cryst.
[2] Few cryst.

Example 6

One hundred grams of disproportionated rosin, acid number 154, were heated with 84.2 cc. 2.12 N sodium hydroxide to produce a mixture with a FRA ratio of 35%. The mixture was stirred into 3850 grams boiling water and, while agitation was continued, 62.0 cc. 2 N sulphuric acid were added to obtain a FRA ratio of 80%. The resulting dispersion was seeded with dehydroabietic acid crystals and slightly agitated. Crystallization was allowed to proceed for 3 hours at a temperature of 75–80° C. The dispersion was then filtered, the crystals washed and dried. The capillary melting point of the crystals was 155–158° C. The filtrate was acidified and the resinous matter contained in it recovered. It had an acid number of 131 and was treated for the removal of neutral bodies.

Yields and constants of the crystalline and the non-crystallizing resin acids are given in the following table:

|  | Yield, per cent | Acid No. | M. P. (R. & B.) °C. | Iodine No. | Rotation, Degrees |
|---|---|---|---|---|---|
| Crystalline product | 50.5 | 178 | [1] 89 | 71 | +37.0 |
| Non-crystallizing acids | 35.6 | 170 | 91 | 65 | +32.0 |

[1] Fused.

*Example 7*

A tall oil resin acid fraction of acid number 176 and containing 74% resin acids, 20% fatty acids and 6% neutral matter, subjected to the process of my co-pending application, Serial No. 745,721, gave crystalline abietic acid in good yield and of a negative rotation.

Fifty grams of this tall oil resin acid fraction were subjected to disproportionation by heating with 0.25 grams iodine at 200° C. for two hours. Ten grams of the disproportionated material, acid number 166, were neutralized with sodium hydroxide to a FRA ratio of 35% and the mixture dispersed at a water ratio of 50. To the nearly boiling dispersion sulphuric acid was added to increase the FRA ratio to 80%. The resulting dispersion was seeded with dehydroabietic acid crystals and kept at 70-80° C. until crystallization was complete. The crystals were separated and washed.

Crystalline product: 3.4 grams dehydroabietic acid, acid number 180, specific rotation +32°.

*Example 8*

N wood rosin was isomerized according to the procedure of Palkin and Harris (J. A. C. S. 56, 1933 (1934)). The isomerized rosin was disproportionated by heating with iodine, as in Example 7. The disproportionated rosin had an acid number of 155.

Ten grams of the disproportionated rosin were refluxed for one hour with 8.8 cc. 2.03 N sodium hydroxide to obtain a FRA ratio of 35%. The mixture was incorporated into 485 grams of nearly boiling water and the FRA ratio increased to 80% by stirring in 6.3 cc. 1.97 N sulphuric acid. The small quantity of resinous matter which precipitated was separated, the dispersion seeded with dehydroabietic acid crystals and allowed to crystallize at 70-80° C.

Crystalline product: 3.5 grams dehydroabietic acid, acid number 174, specific rotation +21.5°.

*Example 9*

Abietic acid, 30.2 grams, obtained from tall oil resin acid raffinate according to my co-pending application, Serial No. 745,721, now U. S. Patent No. 2,493,866, and having an acid number of 181 and a specific rotation of −53°, was treated with sulphur, 3.2 grams, at 180° C., the sulphur being added in small portions over a period of two hours. Then the temperature was raised to 220° C. and kept at that point until the evolution of hydrogen sulphide ceased. The reaction product had an acid number of 170 and a specific rotation of +42.5°.

Ten grams of the dehydrogenated reaction product were refluxed with 9.7 cc. 2.03 N sodium hydroxide to obtain a FRA ratio of 35%. The hot mixture was stirred into 483 grams hot water and the FRA ratio raised to 80% by the addition of sulphuric acid. The resulting dispersion was seeded with dehydroabietic acid crystals and allowed to crystallize.

Crystalline product: 2.0 grams dehydroabietic acid, acid number 179, specific rotation +55.5°.

I claim as my invention:

1. The method of recovering dehydroabietic acid from resin acid material in which abietic acid has been largely converted to dehydroabietic acid, which comprises preparing an aqueous dispersion of said resin acid material at a free resin acids ratio in the range of from 40% to 100% in from 10 to 200 parts by weight of water, and crystallizing dehydroabietic acid therefrom by permitting the dispersion to stand at a temperature of from about normal room temperature to about 100° C.

2. The method of separating resin acid material in which abietic acid has been largely converted to dehydroabietic acid, and alkali metal soaps of said material into crystalline dehydroabietic acid material and non-crystallizing resin acid material, which comprises preparing an aqueous dispersion containing said resin acid material in a condition of from 0 to 60% alkali neutralization, in from 10 to 200 parts by weight of water, crystallizing the dehydroabietic acid therefrom by permitting the dispersion to stand at a temperature of from about normal room temperature to about 100° C., and separating the resulting crystalline material from the aqueous medium, the latter containing the non-crystalline resin acid material.

3. The process of claim 2 wherein the non-crystallizing type resin acids are separated from neutral matter contained in said aqueous medium and recovered as a separate product of the process.

4. The method of separating resin acid material in which abietic acid has been largely converted to dehydroabietic acid, and alkali metal soaps of said material into crystalline dehydroabietic acid material and non-crystallizing resin acid material fractions, which comprises preparing an aqueous dispersion containing said resin acid material regulated to a free resin acids ratio in excess of 40% in from 10 to 200 parts by weight of water to provide a pH of from about 8.5-9.0 to about 3-4, crystallizing dehydroabietic acid therefrom by permitting the dispersion to stand at a temperature of from about 35° C. to about 100° C., and separating the resulting crystalline material from the aqueous phase.

5. The method of separating dehydroabietic acid from resin acid material in which abietic acid has been largely converted to dehydroabietic acid, which comprises preparing an aqueous dispersion containing said resin acid material in a condition of substantially 100% free resin acid concentration in from 20 to 200 parts by weight of water, and crystallizing dehydroabietic acid therefrom by permitting the dispersion to stand at a temperature of from about 35° C. to about 100° C.

6. The method of separating dehydroabietic acid from alkali metal soaps of resin acid material in which abietic acid has been largely converted to dehydroabietic acid, which comprises preparing an aqueous dispersion containing said material regulated to a free resin acids ratio in excess of 40% in from 10 to 200 parts by weight of water to form an oil-in-water type dispersion and to reduce the concentration of formed salt below about 2%, and crystallizing dehydroabietic acid therefrom by permitting the dispersion to stand at a temperature of from about 35° C. to about 100° C.

7. The process of recovering dehydroabietic acid from resin acid material in which abietic acid has been largely converted to dehydroabietic acid, which comprises neutralizing said material with an aqueous alkaline agent, agitating and diluting the soap solution with added water to form a water to solids ratio of approximately 20–200 to 1, decomposing the soap with an acidic material until from about 40% to 100% of the resin acids are in the free state, and crystallizing the dehydroabietic acid therefrom by permitting the dispersion to stand at a temperature of from about 35° C. to about 100° C.

8. The process of separating dehydroabietic acid from resin acid material in which abietic acid has been largely converted to dehydroabietic acid, which comprises partially neutralizing free resin acid content of said material with a strong aqueous solution of an alkali metal base to neutralize in excess of 50% of said free resin acid content, dispersing said mixture in water to provide a water to solids ratio of approximately 20–200 to 1 and to reduce the concentration of alkali metal salt subsequently formed in the process below about 1%, decomposing said soap with an acidic material until from about 50% to 100% of the resin acids are in the free state, and permitting the resulting dispersion to stand at a temperature of from about 35° C. to about 100° C.

9. The process of separating dehydroabietic acid from alkali metal soaps of resin acid material in which abietic acid has been largely converted to dehydroabietic acid, which comprises agitating and diluting the soap solution with water to form a water to solids ratio of approximately 20–200 to 1, decomposing the soap with an acidic material until from 50% to 100% of the resin acids are in the free state and permitting the resulting dispersion to stand at a temperature of from about 35° C. to about 100° C. to crystallize dehydroabietic acid therefrom.

10. The process of separating and recovering crystalline dehydroabietic acid from resin acid material in which abietic acid has been largely converted to dehydroabietic acid, which comprises neutralizing said material with ammonia in the presence of water, the resulting solution containing from about 10 to 200 parts by weight of water to 1 part of the starting material, heating the solution to volatilize the ammonia to form an aqueous dispersion of a pH of less than 9, and crystallizing dehydroabietic acid therefrom by permitting the dispersion to stand at a temperature of from about 35° C. to about 100° C.

FREDERICK H. GAYER.

REFERENCES CITED

The following references are of record in the file of this patent:

UNITED STATES PATENTS

| Number | Name | Date |
|---|---|---|
| 2,311,386 | Hasselstrom | Feb. 16, 1943 |